United States Patent
Fraunhofer

(10) Patent No.: US 7,346,423 B2
(45) Date of Patent: Mar. 18, 2008

(54) METHOD FOR ADAPTIVE FEED RATE REGULATION ON NUMERICALLY CONTROLLED MACHINE TOOLS

(75) Inventor: Hermann Fraunhofer, Palling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/515,280

(22) Filed: Aug. 31, 2006

(65) Prior Publication Data
US 2007/0088455 A1 Apr. 19, 2007

(30) Foreign Application Priority Data
Aug. 31, 2005 (DE) .................. 10 2005 041 175

(51) Int. Cl.
*G06F 19/00* (2006.01)
(52) U.S. Cl. .................. 700/173; 700/188; 318/571
(58) Field of Classification Search ............... 700/173, 700/188; 318/571, 566, 433; 409/80; 408/6
See application file for complete search history.

(56) References Cited

U.S. PATENT DOCUMENTS

| | | | |
|---|---|---|---|
| 4,078,195 A | | 3/1978 | Mathias et al. |
| 6,384,560 B1* | | 5/2002 | Kakino et al. .......... 318/566 |
| 6,650,960 B2* | | 11/2003 | Kakino et al. .......... 700/173 |
| 2004/0167659 A1* | | 8/2004 | Scherer .................. 700/173 |
| 2007/0046238 A1* | | 3/2007 | Xu ......................... 318/571 |

* cited by examiner

*Primary Examiner*—Leo Picard
*Assistant Examiner*—Steven R. Garland
(74) *Attorney, Agent, or Firm*—Kenyon & Kenyon LLP

(57) ABSTRACT

In a method for the adaptive feed rate regulation on a numerically controlled machine tool, which is used for the metal-removing processing of workpieces using a tool rotating on a spindle according to the specification of an NC program, the input power of the spindle is held as constant as possible by the influence of a tool feed rate established in the NC program for the motion between the tool and the workpiece. The method for the adaptive feed rate regulation is activated by a command of the NC program that initiates the processing of the workpiece, and is deactivated by a command of the NC program that terminates the processing of the workpiece.

17 Claims, 1 Drawing Sheet

METHOD FOR ADAPTIVE FEED RATE REGULATION ON NUMERICALLY CONTROLLED MACHINE TOOLS

CROSS-REFERENCE TO RELATED APPLICATIONS

The present application claims priority to Application No. 10 2005 041 175.4, filed in the Federal Republic of Germany on Aug. 31, 2005, which is expressly incorporated herein in its entirety by reference thereto.

FIELD OF THE INVENTION

The present invention relates to a method for the adaptive feed rate regulation on numerically controlled machine tools. Such methods may make possible an optimal utilization of the possibilities of a machine tool in interaction with numerical control.

BACKGROUND INFORMATION

A numerically controlled machine tool (CNC) executes an NC program in which various processing steps are specified one after another. For a milling machine, the relative motions between a workpiece and a tool are established and processed one after another. The milling cutter fastened to a rotating spindle removes material from the workpiece. In an NC program, besides the actual processing steps, tasks such as changing from one tool to another, starting and stopping the rotary motion of the tool spindle or feed motions are also established, that is, motions of the tool without intervention in the workpiece.

In connection with numerically controlled machine tools, it is described, for example, in U.S. Pat. No. 4,078,195, that one may make the feed of a rotating, metal removing tool a function of a parameter observed during processing, such as the input power of the tool spindle. For a constant feed, the power used for turning the spindle at the programmed setpoint rotational speed is a function of various parameters. Thus, the power is greater, the harder the processed workpiece, and the larger the processed surface of the workpiece. A tool entering more deeply into the workpiece requires greater spindle power, since at constant feed, more material has to be removed per unit of time. Thus, in order to obtain a constant high spindle power, and with that rapid processing, the feed has to be appropriately regulated.

Conventional adaptive feed rate regulations, however, are believed to have the disadvantage that, in order to use the adaptive feed rate regulation, certain commands have to be taken up into each NC program in order to control the feed rate regulation itself. These may be simple commands, such as switching on and off the feed rate regulation itself, or the establishment of certain boundary values. This means that each NC program, for which the adaptive feed rate regulation is to be used, has to be prepared for it with great effort. For NC programs for processing only a small number of pieces, this is not worthwhile.

SUMMARY

Example embodiments of the present invention provide a method for adaptive feed rate regulation for a numerically controlled machine tool, which makes possible using the feed rate regulation for each NC program in a simple and safe manner, e.g., without having to undertake adjustments in the NC program itself.

Methods for the adaptive feed rate regulation on numerically controlled machine tools are described below. The machine tool is used for the metal-removing processing of workpieces, using a tool rotating on a spindle according to the specification of an NC program.

The input power of the spindle is held as constant as possible by influencing the tool feed rate established in the NC program for the motion between tool and workpiece. The method for the adaptive feed rate regulation in this context is activated by a command of the NC program that initiates the processing of the workpiece, and is deactivated by a command of the NC program that terminates the processing of the workpiece.

Such a command initiating the processing may be represented, for example, by the acceleration of the spindle to a setpoint rotary speed, and correspondingly, the command to terminate the processing may be a command to stop the spindle.

The method for adaptive feed rate regulation is provided such that an operator of the numerically controlled machine tool only quite basically has to decide, using a selection device, whether the adaptive feed rate regulation is to be used. The operator does not have to concern himself with settings and optimizations. For example, the NC program used does not have to be especially prepared for the use of the adaptive feed rate regulation. During the first processing of an NC program, the numerical control recognizes that there is as yet no parameter file present that corresponds to the respective NC program. This parameter file is subsequently established during the first processing in a learning mode, and, as of the second processing of the NC program, it is used for performing the adaptive feed rate regulation.

Consequently, since no programming effort is required for processing any desired NC program using an adaptive feed rate regulation, significant advantage may be obtained from such a method, without great effort. The operation time of a tool is able to be reduced, the wear of a tool is able to be monitored, and greater damage is able to be avoided in response to a tool fracture. Since all these benefits are possible without effort, the positive effect of an adaptive feed rate regulation becomes available substantially more simply, and with that, the corresponding method becomes applicable in a broader sense.

According to an example embodiment of the present invention, a method for adaptive feed rate regulation in a numerically controlled machine tool for metal-removing processing of a workpiece includes: rotating a tool on a spindle according to an NC program; holding substantially constant an input power of the spindle by influencing a tool feed rate established in the NC program for motion between the tool and the workpiece; activating the adaptive feed rate regulation by a command of the NC program that initiates processing of the workpiece; and deactivating the adaptive feed rate regulation by a command of the NC program that terminates the processing of the workpiece.

The adaptive feed rate regulation may be activated in the activating step after a command that initiates the processing of the workpiece for starting a spindle rotation and only when the spindle has reached a setpoint rotary speed.

The method may include checking, for each tool called up in the NC program, in a tool table whether an adaptive feed rate regulation is provided for the tool, and the adaptive feed rate regulation may be activated in the activating step only if an adaptive feed rate regulation is provided for the tool in the tool table.

In the tool table, one of a plurality of profiles filed in a table for the adaptive feed rate regulation may be assigned to each tool for which an adaptive feed rate regulation is provided.

The method may include operating the adaptive feed rate regulation in a learning mode if a current NC program is being executed for a first time, and the learning mode may include writing parameters that are required for the adaptive feed rate regulation into a parameter file corresponding to the NC program.

The method may include subdividing the NC program into individual cuts using spindle start commands and spindle stop commands, and the parameters written into the parameter file may include a maximum attained spindle power for each cut.

Each cut may include an idling phase, an entry phase, a processing phase and an exit phase, and the parameters written into the parameter file may include a maximum spindle power that occurs during the processing phase for each cut.

The method may include operating the adaptive feed rate regulation in a regulation mode if, at a time of execution of the NC program, the parameter file corresponding to the NC program is present.

In response to a manual stop of the learning mode during a cutting procedure, the adaptive feed control may be operated up to an end of the cutting procedure in the regulation mode, using the parameter file established up to the stop of the learning mode.

In response to a detection of an incomplete parameter file, cuts for which a parameter is present in the parameter file may be processed in the regulation mode, cuts for which a parameter is not present may be processed in the learning mode, and the method may include ascertaining missing parameters and updating the parameter file.

Further aspects and details of example embodiments of the present invention are described below with reference to the appended Figures.

DETAILED DESCRIPTION

Figure 1:
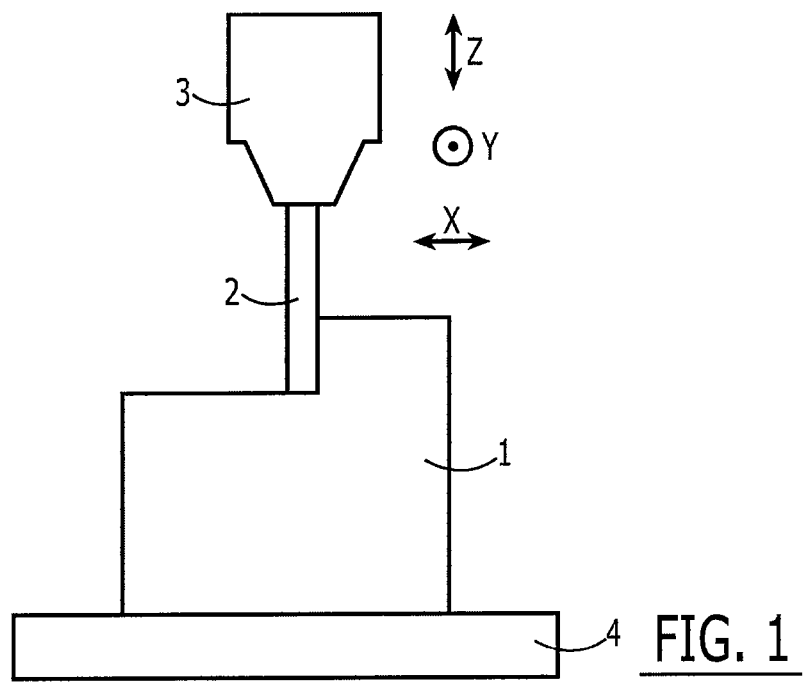
FIG. 1 schematically illustrates a segment of a machine tool.

FIG. 1 schematically illustrates a section of a machine tool. A workpiece 1 is mounted on a table 4. As illustrated in FIG. 1, the workpiece 1 is being worked on by a tool 2 (e.g., a milling tool), which is fastened to a spindle 3, and is rotated, e.g., at great rotary speed by this spindle 3.

Tool 2 is movable with respect to workpiece 1 in three directions X, Y, Z. Other machine tools are able to permit further or different directions of motion between tool 2 and workpiece 1, for example, by additional swivel axes.

The input power of spindle 3 depends on at what feed and at how much contact area with workpiece 1 milling cutter 2 is being moved. Thus, the input power is relatively small if spindle 3 is already rotating at setpoint rotary speed, but milling tool 2 is not yet in contact with workpiece 1. The spindle power is very large if milling cutter 2 is being moved very rapidly and at large contact area through workpiece 1. The spindle then has to perform the work necessary to machine the volume traversed in workpiece 1 per unit of time. The spindle power is also a function of the condition of milling tool 2. A new milling tool having very sharp cutting edges requires less work for the same machining volume than a worn cutting tool 2 having blunt cutting edges.

When programming an NC program, these relationships are taken into account to the greatest extent possible. Thus, an attempt is made to program a cut of cutting tool 2 through workpiece 1 at a lower depth of immersion using a greater feed than a cut having a greater depth of immersion. Only by an optimal utilization of the maximum spindle power are the possibilities of a machine tool fully utilized. However, since not all circumstances are able to be taken into consideration when doing the programming (for example, the condition of tool 2), with respect to the feed, the need for optimization is believed to exist also in the case in which the known geometrical boundary conditions have already been considered. Besides, such feed optimizations may not be mastered by all programming systems.

Conventional feed rate regulations may therefore observe the spindle power during a cutting procedure. If the spindle power is less than a specified value, the speed of tool 2 is increased within certain limits, or is lowered if the spindle power is above the specified value. The usual influencing ranges are approximately within a range of 50% to 150% of the programmed feed. However, if, even after a reduction of the feed by the maximum permissible amount, the spindle power is too high, it may be concluded that there is a problem, such as the fracture of tool 2, and the reaction may be an immediate stop of the machine tool. In this manner, possibly occurring resulting damage may be minimized.

Figure 2:
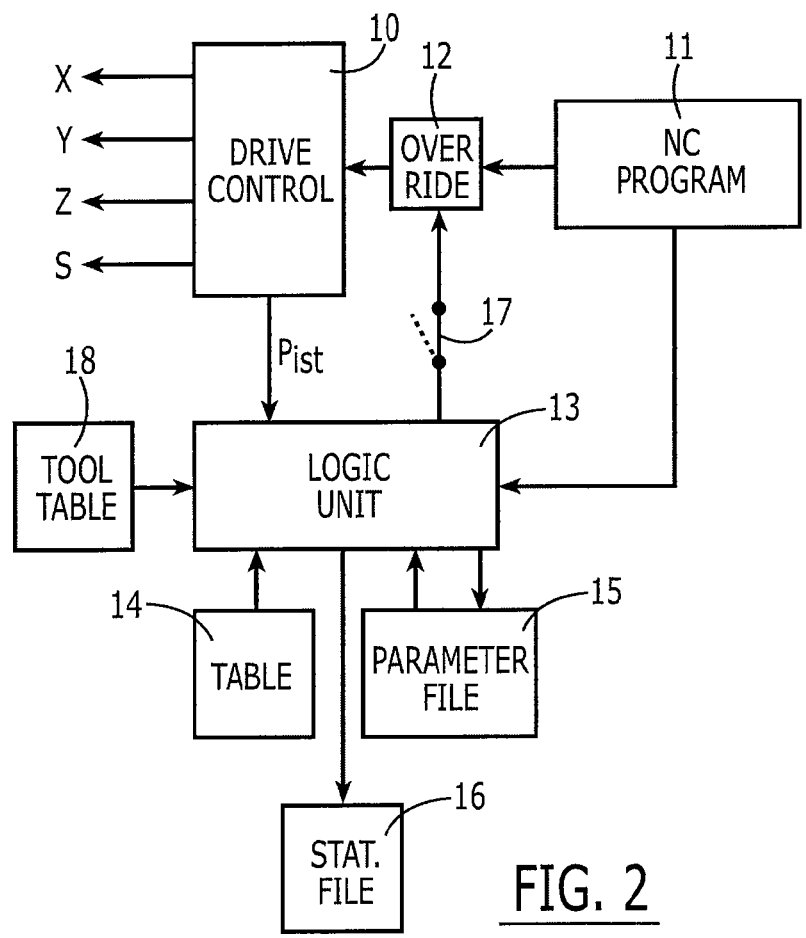
FIG. 2 is a block diagram of a numerical control having adaptive feed rate regulation.

In a block diagram, FIG. 2 schematically illustrates the cooperation of components taking part in the method for feed rate regulation of a numerical control. The basic function of numerical control is to read out an NC program 11 and, in a drive control 10, to manage the drives of axes X, Y, Z as well as the drive of spindle S (component 3 in FIG. 1) according to the specifications of NC program 11.

A numerical control usually has an override function 12 by which the feeds established in NC program 11 are able to be influenced. This is usually done by a potentiometer operable by the operator, by which the feed is able to be set between 0% (standstill) and, for example, 150% of the programmed value. This setting has the same effect on all axes, so that the programmed tool path is steadily maintained.

The method for feed rate regulation occurs at this override function 12 and, in a manner, takes over the role of the operator, in order to vary the feed within certain limits. In this context, it is provided that even when there is an active feed rate regulation, the operator is able at any time to set a lower feed rate via the override function. This is an important safety requirement. One possible adaptation is that in the case of override values, set at the potentiometer, of less than 50%, this setting fundamentally has preference over the adaptive feed rate regulation.

A logic unit 13, which includes the logic for the adaptive feed rate regulation, has various tasks. Thus, it analyzes the NC program and subdivides it into a plurality of sectional procedures or short steps. A cutting procedure is between a command to start spindle 3 (no matter in which direction, e.g., an M03 or an M04 command) and a command for stopping spindle 3 (e.g., an M05 command). Only during such a cutting procedure is logic unit 13 active.

A cutting has a plurality of phases:

Acceleration phase: First, spindle 3 accelerates to its setpoint rotary speed.

Idling phase: If the spindle has reached the setpoint rotary speed, it takes up idling power Pfree.

Entry phase: In an entry phase, tool 2 enters into workpiece 1. The entry phase counts as terminated when workpiece 2 has covered a path corresponding to the radius of tool 2.

Processing phase: At this point, tool 2 is engaged with workpiece 1 and is machining it.

Exit phase: Tool 2 leaves the workpiece.

An idling phase again follows the exit phase. There then follows either an additional acceleration phase, during which spindle 3 is brought to a standstill, or a renewed entry phase, when tool 2 again draws a processing path through workpiece 1.

Cutting in the sense of this example begins and ends with an acceleration phase. In this context, a cutting is able to include the sequence: idling phase, entry phase, processing phase, exit phase, idling phase several times over.

A meaningful adaptive feed rate regulation is only possible during the processing phase, but an influencing by override function 12 may nevertheless be meaningful during the idling phase, the entry phase and the exit phase. On the other hand, during the acceleration phase no influencing by override function 12 occurs.

The actual input power Pist of spindle 3 is transmitted by drive control 10 to logic unit 13, either at specified short time intervals or upon demand.

Logic unit 13 further takes into consideration the exchanged tool, in each case. For this, it looks up in a tool table 18, which includes a series of data for each tool 2, whether a feed rate regulation is provided for this tool. This may occur, e.g., in that, in tool table 18, an entry is provided which selects one of several possible embodiments in the form of various profiles for the feed rate regulation. If the entry is missing, or if it includes a statement that explicitly no feed rate regulation is to take place, the feed rate regulation remains inactive for this tool.

The various profiles for the feed rate regulation are specified in a table 14. This table 14 may have, e.g., the following form:

| Name | Vmin | Vmax | Vfree | Vlfl | Sdiff | Ovld | Plvl |
|---|---|---|---|---|---|---|---|
| Standard | 70% | 130% | 140% | 70% | 8% | F | 3% |
| Safe | 80% | 120% | 120% | 90% | 10% | M | 3% |
| Rapid | 90% | 150% | 150% | 100% | 12% | — | 3% |
| Monitor | 100% | 100% | 100% | 100% | 8% | S | 3% |

In this context, the entries in table 14 have the following meanings. For each of the profiles given in this example, first the name of the profile is named in column "Name," which is also entered in tool table 18, as described above. In the next column, "Vmin," it is stated to which value in percent the programmed feed is allowed to be regulated if the spindle power is too great. In the next column, "Vmax," it is stated to which value in percent the programmed feed is allowed to be regulated if the spindle power is too low. The regulation between the two values Vmin and Vmax takes place only during the processing phase.

In the next column, "Vfree," it is stated to which value in percent of the programmed feed the override function is to be set, if tool 2 is not engaged with workpiece 1, that is, during the idling phase.

The next column, "Vlfl," indicates to which feed in percent of the programmed feed the override function is to be set during the entry phase and the exit phase, that is, after an entry and exit of tool 2 in and out of workpiece 1 has been registered. This feed is then considered to be valid on a tool path length corresponding to the radius of tool 2. Thus, upon entry into workpiece 1, the mechanical system of the machine tool is protected, and upon exit it is prevented that tool 2 is accelerated above the programmed feed because of the spindle power dropping off when the tool leaves workpiece 1. Rather, the speed is reduced in good time before the actual exit. This avoids ripping out from workpiece 1.

The next column, "Sdiff," states the maximum permitted deviation of the actual spindle rotary speed in percent of the programmed spindle rotary speed.

The column "Ovld" defines the reaction to an overload of the spindle, that is, for the case in which, despite the maximum permitted reduction of the feed, the actual spindle rotary speed deviates from the setpoint rotary speed by more than the maximum permitted deviation. In this context, F indicates relieving of the tool and subsequent stopping, S indicates immediate stopping, M indicates only reporting the overload to a superordinated unit.

Parameter "Plvl" in the last column states by how many percent the threshold power, at which an entry or exit of tool 2 into and from workpiece 1 is detected, is above the idling power Pfree.

The following describes how logic unit 13 proceeds to process an NC program 11 by using tool table 18 and table 14 according to possibilities under adaptive feed rate regulation. For this, it is assumed that NC program 11 has not yet been executed. The entries in tool table 18 and table 14 explained above are present so that a feed rate regulation is possible in principle. What is decisive is that this feed rate regulation is able to be executed without any change whatsoever in the NC program. An operator of the machine tool, using selection device 17, has to select only quite basically that the feed rate regulation is to be activated. This is indicated in FIG. 2 by a switch 17 in the path from logic unit 13 to override function 12. In practice, selection device 17 may exist as a selection field shown on a screen of the numerical control, from which one may select and deselect.

Logic unit 13 checks whether a parameter file 15, that is assigned to NC program 11, already exists. This may be simplified, for example, by using a corresponding name assignment for parameter file 15 if the latter bears a name that is the same, except for a file ending, as NC program 11. Since, in this example, a first processing of NC program 11 is assumed, the matching parameter file 15 does not exist yet, and has to be created and filled out during the first processing.

For this, logic unit 13 breaks down NC program 11 into individual cuts, and creates a data record for each cut in parameter file 15, which begins, for example, with the cut number. Since, in NC program 11, it is also established, via a TOOL CALL command, by using which tool 2 a cut is to be performed, the profile assigned to this tool, for the feed control, may be read out using tool table 18 and assigned to the respective cut. Alternatively, the parameters filed in table 14, of the respective profile, may also be assigned directly to the cut number in parameter file 15.

During the learning phase, the individual cuts are more finely subdivided into the acceleration phases, idling phases, entry phases, processing phases and exit phases described above.

NC program 11 is executed without feed rate regulation, that is, always with the programmed feed. In this process, logic unit 13 records maximum power Pmax that occurs in the processing phases. To do this, current spindle power Pist has to be transmitted from drive control 10 to logic unit 13, for example, as the percentage value of the nominal spindle power. In addition, idling power Pfree of spindle 3 is recorded, which is present after the acceleration of spindle 3 to the setpoint rotary speed, and still without contact of milling cutter 2 with workpiece 1. With the aid of parameter "Plvl" described above, entry into workpiece 1 may thus be detected, and an appropriate reaction (slowing down) may be undertaken in the feed rate regulation. A significant parameter stored in parameter file 15 is the maximum spindle power Pmax that occurs during the processing phases of a cut. During the next execution of NC program 11, the feed rate regulation will try to process all processing phases of the cut using this spindle power, as more fully described below.

Under certain circumstances, the execution of a cut takes rather a long time. In this context, if after a certain time no additional peaks in the spindle power are to be expected, the operator is able to break off the learning mode for this cut, and thereby switch over to the regulating mode. The current cut is then brought to an end under adaptive feed rate control, the parameters just ascertained and written into parameter file 15 being used. During the next cut, the logic unit will establish that parameter file 15 is incomplete, will switch again into the learning mode for this cut, and will update the missing parameters in parameter file 15.

After a complete execution of NC program 11, a complete parameter file 15 is present which includes an entry, for each cut of NC program 11, that makes possible an adaptive feed rate regulation. At the next start of NC program 11, logic unit 13 will therefore recognize that NC program 11 is able to be operated right from the beginning under feed rate regulation, provided that is what has been set via selection device 17. An additional learning mode is not necessary.

A statistics file 16 that corresponds to NC program 11 is created already during the execution of NC program 11 in the learning mode. In this file, various values are stored which may be used, for example, for determining the effectiveness of the feed rate regulation. Thus, for each cut, the processing time in the learning mode and the processing time under feed rate regulation are able to be stored and compared later. Thus, the statistics file is generated in the learning mode and updated during the active feed rate regulation.

That the method described here makes possible an adaptive feed rate control without any change in NC program 11, does not mean that such changes in NC program 11 are excluded. It may be provided to completely exclude certain processing steps in the NC program from the feed rate regulation. This may be attained using special commands in NC program 11, which act on selection device 17 such that an activated feed rate regulation is able to be deactivated intermittently.

During the second execution of NC program 11, e.g., when parameter file 15 is present, and filled with the data for each cut, the logic unit works in regulation mode. In this context, during the idling phases, the entry phases and the exit phases, the override setting established in table 14 is applied. The greater feed in the idling phase, in this example, simply saves time, the reduced feed during entry and exit of the tool protects the mechanical system of the machine tool and of tool 2. If, instead of a special feed value, simply "maximum feed" (rapid motion) is programmed in NC program 11, there is no application for override settings.

During the actual processing phases, a regulation takes place of the spindle power by adaptation of the feed via override function 12 to the previously ascertained maximum power value Pmax, which provides the aspects mentioned above.

What is claimed is:

1. A method for adaptive feed rate regulation in a numerically controlled machine tool for metal-removing processing of a workpiece, comprising:
rotating a tool on a spindle according to an NC program;
holding substantially constant an input power of the spindle by influencing a tool feed rate established in the NC program for motion between the tool and the workpiece;
activating the adaptive feed rate regulation by a command of the NC program that initiates processing of the workpiece and that starts a spindle rotation; and
deactivating the adaptive feed rate regulation by a command of the NC program that terminates the processing of the workpiece.

2. The method according to claim 1, wherein the adaptive feed rate regulation is activated only when the spindle has reached a setpoint rotary speed.

3. The method according to claim 1, further comprising checking, for each tool called up in the NC program, in a tool table whether an adaptive feed rate regulation is provided for the tool, the adaptive feed rate regulation being activated in the activating step only if an adaptive feed rate regulation is provided for the tool in the tool table.

4. The method according to claim 3, wherein in the tool table, one of a plurality of profiles filed in a table for the adaptive feed rate regulation is assigned to each tool for which an adaptive feed rate regulation is provided.

5. The method according to claim 1, further comprising operating the adaptive feed rate regulation in a learning mode if a current NC program is being executed for a first time, the learning mode including writing parameters that are required for the adaptive feed rate regulation into a parameter file corresponding to the NC program.

6. The method according to claim 5, further comprising subdividing the NC program into individual cuts using spindle start commands and spindle stop commands, the parameters written into the parameter file including a maximum attained spindle power for each cut.

7. The method according to claim 6, wherein each cut includes an idling phase, an entry phase, a processing phase and an exit phase, the parameters written into the parameter file including a maximum spindle power that occurs during the processing phase for each cut.

8. The method according to claim 5, further comprising operating the adaptive feed rate regulation in a regulation mode if, at a time of execution of the NC program, the parameter file corresponding to the NC program is present.

9. The method according to claim 8, wherein, in response to a manual stop of the learning mode during a cutting procedure, the adaptive feed control is operated up to an end of the cutting procedure in the regulation mode, using the parameter file established up to the stop of the learning mode.

10. The method according to claim 8, wherein in response to a detection of an incomplete parameter file, cuts for which a parameter is present in the parameter file are processed in the regulation mode, and cuts for which a parameter is not present are processed in the learning mode, the method further comprising ascertaining missing parameters and updating the parameter file.

11. A method for adaptive feed rate regulation in a numerically controlled machine tool for metal-removing processing of a workpiece, comprising:
- rotating a tool on a spindle according to an NC program;
- holding substantially constant an input power of the spindle by influencing a tool feed rate established in the NC program for motion between the tool and the workpiece;
- activating the adaptive feed rate regulation by a command of the NC program that initiates processing of the workpiece;
- deactivating the adaptive feed rate regulation by a command of the NC program that terminates the processing of the workpiece;
- operating the adaptive feed rate regulation in a learning mode if a current NC program is being executed for a first time, the learning mode including writing parameters that are required for the adaptive feed rate regulation into a parameter file corresponding to the NC program; and
- subdividing the NC program into individual cuts using spindle start commands and spindle stop commands, the parameters written into the parameter file including a maximum attained spindle power for each cut.

12. The method according to claim 11, wherein each cut includes an idling phase, an entry phase, a processing phase and an exit phase, the parameters written into the parameter file including a maximum spindle power that occurs during the processing phase for each cut.

13. The method according to claim 11, further comprising operating the adaptive feed rate regulation in a regulation mode if, at a time of execution of the NC program, the parameter file corresponding to the NC program is present.

14. The method according to claim 13, wherein, in response to a manual stop of the learning mode during a cutting procedure, the adaptive feed control is operated up to an end of the cutting procedure in the regulation mode, using the parameter file established up to the stop of the learning mode.

15. The method according to claim 13, wherein in response to a detection of an incomplete parameter file, cuts for which a parameter is present in the parameter file are processed in the regulation mode, and cuts for which a parameter is not present are processed in the learning mode, the method further comprising ascertaining missing parameters and updating the parameter file.

16. A method for adaptive feed rate regulation in a numerically controlled machine tool for metal-removing processing of a workpiece, comprising:
- rotating a tool on a spindle according to an NC program;
- holding substantially constant an input power of the spindle by influencing a tool feed rate established in the NC program for motion between the tool and the workpiece;
- activating the adaptive feed rate regulation by a command of the NC program that initiates processing of the workpiece;
- deactivating the adaptive feed rate regulation by a command of the NC program that terminates the processing of the workpiece; and
- checking, for each tool called up in the NC program, in a tool table whether an adaptive feed rate regulation is provided for the tool, the adaptive feed rate regulation being activated in the activating step only if an adaptive feed rate regulation is provided for the tool in the tool table.

17. The method according to claim 16, wherein in the tool table, one of a plurality of profiles filed in a table for the adaptive feed rate regulation is assigned to each tool for which an adaptive feed rate regulation is provided.

* * * * *